UNITED STATES PATENT OFFICE.

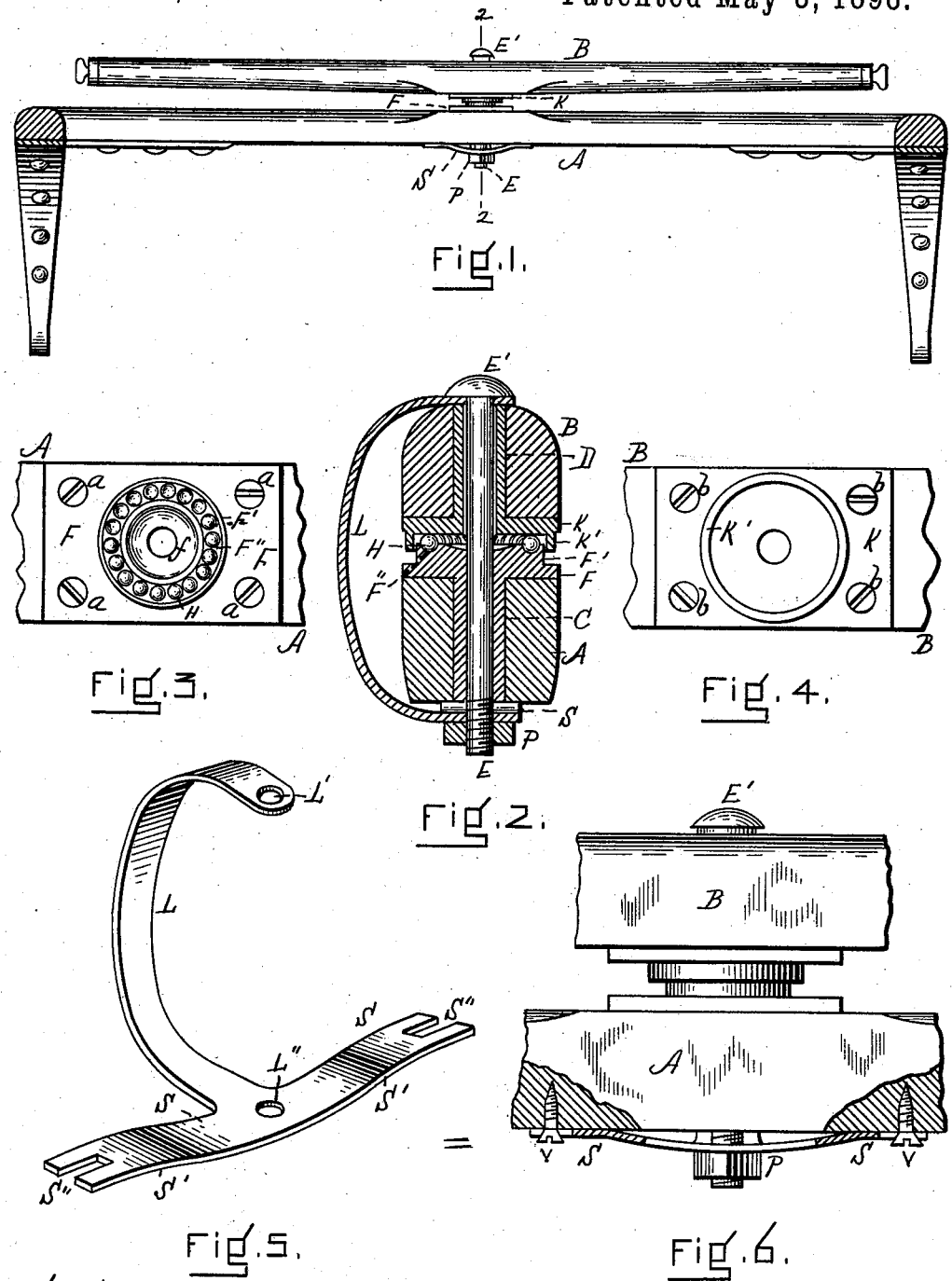

FRANK W. CHICKERING, OF CABOT, VERMONT.

WHIFFLETREE-COUPLING.

SPECIFICATION forming part of Letters Patent No. 603,257, dated May 3, 1898.

Application filed December 3, 1897. Serial No. 660,596. (No model.)

*To all whom it may concern:*

Be it known that I, FRANK W. CHICKERING, a citizen of the United States, residing at Cabot, in the county of Washington and State of Vermont, have invented certain new and useful Improvements in Whiffletree-Couplings, of which the following is a specification.

This is an improved coupling for connecting the whiffletree of a carriage or wagon with the cross-bar; and the principal objects of the invention are to more effectually prevent the coupling from undue wear, whereby rattling, squeaking, and tipping or canting of the whiffletree are prevented, protection to the coupling from dust, water, or mud, and the application of a safety appliance for temporarily holding the whiffletree and cross-bar in the event of the breakage of the bolt.

The invention consists in the novel construction and arrangement of parts hereinafter described, and illustrated in the accompanying drawings, in which—

Figure 1 is a front elevation of a whiffletree and cross-bar with my coupling applied thereto. Fig. 2 is a cross vertical section, enlarged, taken on line 2, Fig. 1. Fig. 3 is a plan view of the under plate making a portion of the ball-bearing. Fig. 4 is a view of the under side of the upper plate or cup making a portion of the ball-bearing. Fig. 5 is a perspective view of the spring or yoke which extends from the upper side of the whiffletree to the under side of the cross-bar. Fig. 6 is an enlarged view, in front elevation, showing the central portions of the whiffletree and cross-bar with the coupling applied thereto, small portions of the cross-bar and spring-yoke being illustrated in section.

Similar letters of reference indicate corresponding parts.

A represents the cross-bar, and B the whiffletree. The vertical bore in the cross-bar is provided with the steel lining C, and the corresponding bore in the whiffletree is provided with the steel lining D. The bolt E extends through these tubular linings C D, which, being made preferably of case-hardened steel, provide almost indestructible bearings. Integral with the steel bearings C is a plate F, which extends therefrom and overlaps and is secured by suitable screws *a* to the upper surface of the cross-bar A. This plate is formed up centrally into the circular platform F', which is provided with the circular groove F''', within which lie the steel balls H. This metallic platform or raised circular block F'' is preferably recessed or hollowed out centrally at *f*. (See Figs. 2 and 3.) Integral with the steel lining or bearing D is the steel plate K, which extends under the whiffletree B and is secured thereto by suitable screws *b*. This plate is provided with a circular flange K', which extends down and around the edge of the circular block or platform F'. (See Figs. 2 and 4.)

L is a metallic spring or yoke made substantially C-shaped and provided at its upper end with a hole L', through which the bolt E extends, the upper end of said spring thereby resting on the upper side of the whiffletree under the head E' of said bolt. The lower end of the spring is provided with the hole L'', through which the lower portion of the bolt extends, thereby holding the said end of the spring under the cross-bar and between said cross-bar and the nut P. This spring at its lower end is provided with two spring-arms S, each of which is curved upward at S' and has its ends provided with the longitudinal notches S''. These arms therefore extend longitudinally under the cross-bar, the central portion—that is to say, the portion which constitutes the lower end of the spring L—being at some distance below the under side of the cross-bar and being held on the bolt by said nut P. Screws V extend through the notches S'' into the cross-bar and allow expansion of the spring-arms S'.

The tension of the lower portion of the spring is of course regulated by the nut P, and the effect thereof, in connection with the steel bearings or linings C D and the ball-bearings above described, is to hold the bolt E stationary while the whiffletree moves thereon. Moreover, should the bolt break the spring L will act as a safety-coupling, holding the whiffletree down, so that the flange or cup K' will by overlapping, as it does, the circular platform or block F' prevent the whiffletree and cross-bar from parting. In ordinary couplings the bolt extends through bores in the wood and itself moves, with the effect of wearing into the wood, and thus producing rattling and squeaking and allowing the whiffletree to tip or cant to one side or the other. It is evident that by means of the steel bearings C D and the ball-bearing the amount of wear is reduced to a minimum and the nut P is enabled to be turned well up, so that no rattling can occur, and the bolt be held stationary while the whiffletree plays or turns with relation thereto. The inverted cup K' not only acts in connection with the spring L as a safety-coupling in case of accident, but also prevents dust, mud, and water from entering the ball-bearing and injuring, rusting, and wearing the coupling. Thus the wearing qualities of the device are enhanced, the danger of squeaking obviated, and the coupling rendered temporarily safe in case the bolt should accidentally become broken.

Having thus fully described my invention, what I claim, and desire to secure by Letters Patent, is—

1. In a whiffletree-coupling, the whiffletree; the hard-metal lining D rigid in the bore therein and provided with the plate K extending under and secured to the under side of the whiffletree, said plate being formed with the downwardly-projecting annular flange or cup K'; the cross-bar; the hard-metal lining C rigid in the bore therein and provided with the flange or plate F extending over and secured to the upper surface of the cross-bar, said plate being provided with the integral metallic platform or circular block F' formed with the annular groove F'' for the reception of the balls H, said cup or flange extending down over the platform or block as described; the bolt E extending down through the said linings D and C; and a safety-spring one end of which is secured to the bolt between the head thereof and the upper surface of the whiffletree, and the other end is secured to the bolt below the cross-bar and held in such position by a suitable nut, substantially as described.

2. In a whiffletree-coupling, the whiffletree provided with the metal lining D secured thereto and formed with the plate K extending under the whiffletree, said plate being provided with the downwardly-extending flange or cup K'; the cross-bar provided with the metal lining C formed with the plate F extending over the surface of the cross-bar, said plate being provided with the circular platform or block F' extending up into the said cup; the bolt E extending through said linings in the whiffletree and cross-bar; the spring L provided at its lower end with the oppositely-extending spring-arms S, the upper end of said spring being secured to the bolt between the head thereof and the upper side of the whiffletree and the lower end being secured to said bolt below the cross-bar, said spring-arms being formed to hold the portion of the spring next the lower end of the bolt normally at a short distance below the cross-bar; and a nut adapted to regulate the tension of the spring at that point thereby holding the two parts of the coupling together and keeping the bolt rigid with the cross-bar, thus allowing the whiffletree to turn thereon, substantially as set forth.

FRANK W. CHICKERING.

Witnesses:
M. D. WELLS,
SILAS H. CHICKERING.